United States Patent

Sadek

(10) Patent No.: US 10,524,148 B2
(45) Date of Patent: Dec. 31, 2019

(54) UTILIZING IN-DEVICE COEXISTENCE MESSAGE FOR INTERFERENCE MANAGEMENT IN UNLICENSED BANDS

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 14/255,897

(22) Filed: Apr. 17, 2014

(65) Prior Publication Data

US 2015/0304872 A1 Oct. 22, 2015

(51) Int. Cl.
 H04W 24/10 (2009.01)
 H04W 16/14 (2009.01)
 H04W 88/06 (2009.01)

(52) U.S. Cl.
 CPC .................................. H04W 24/10 (2013.01)

(58) Field of Classification Search
 CPC ...... H04W 24/10; H04W 16/14; H04W 88/06
 See application file for complete search history.

(56) References Cited

U.S. PATENT DOCUMENTS

| | | | | |
|---|---|---|---|---|
| 2002/0188723 A1* | 12/2002 | Choi | ..................... | H04W 36/06 709/225 |
| 2006/0056344 A1* | 3/2006 | Roy | ..................... | H04W 36/06 370/329 |
| 2008/0192707 A1* | 8/2008 | Xhafa | ............... | H04W 74/0808 370/336 |
| 2009/0010194 A1 | 1/2009 | Seok et al. | | |
| 2009/0011768 A1* | 1/2009 | Seok | .................... | H04L 41/5003 455/450 |
| 2009/0023448 A1 | 1/2009 | Attar et al. | | |
| 2009/0196210 A1* | 8/2009 | Desai | ................ | H04W 52/0225 370/311 |
| 2012/0020231 A1 | 1/2012 | Chen et al. | | |
| 2012/0063373 A1* | 3/2012 | Chincholi | ............... | H04L 5/001 370/281 |
| 2012/0082140 A1 | 4/2012 | Lin et al. | | |
| 2013/0083783 A1* | 4/2013 | Gupta | ................... | H04W 4/005 370/338 |

(Continued)

FOREIGN PATENT DOCUMENTS

CN 101690013 A 3/2010
EP 2843856 A1 3/2015

(Continued)

OTHER PUBLICATIONS

International Search Report and Written Opinion—PCT/US2015/025671—ISA/EPO—dated Jan. 4, 2016.

*Primary Examiner* — Moo Jeong
(74) *Attorney, Agent, or Firm* — Arent Fox, LLP

(57) ABSTRACT

Described herein are techniques for efficient LTE operation in the unlicensed band. For example, the technique may involve initiating, at the wireless device, a signal measurement of an unlicensed communication band device. The technique may also involve sending, to an access point configured for operation in the unlicensed communication band, a measurement report including the signal measurement of the unlicensed communication band device.

15 Claims, 8 Drawing Sheets

(56) References Cited

U.S. PATENT DOCUMENTS

| | | | |
|---|---|---|---|
| 2013/0094382 A1* | 4/2013 | Ahn | H04B 7/26 370/252 |
| 2013/0165134 A1* | 6/2013 | Touag | H04W 72/0486 455/452.1 |
| 2013/0184020 A1* | 7/2013 | Hoshihara | H04W 24/02 455/501 |
| 2013/0208641 A1 | 8/2013 | Baghel et al. | |
| 2013/0272260 A1* | 10/2013 | Bitran | H04W 16/14 370/329 |
| 2013/0322279 A1 | 12/2013 | Chincholi et al. | |
| 2015/0119101 A1* | 4/2015 | Cui | H04W 48/18 455/525 |
| 2016/0309491 A1* | 10/2016 | Dai | H04W 72/04 |

FOREIGN PATENT DOCUMENTS

| | | | |
|---|---|---|---|
| JP | 2004520766 A | 7/2004 | |
| JP | 2005523616 A | 8/2005 | |
| JP | 2010522448 A | 7/2010 | |
| JP | 2010532947 A | 10/2010 | |
| WO | WO-02093839 A2 | 11/2002 | |
| WO | WO-03090037 A2 | 10/2003 | |
| WO | 2008085952 A1 | 7/2008 | |
| WO | WO-2008078311 A2 | 7/2008 | |
| WO | WO-2008103745 A1 | 8/2008 | |
| WO | WO-2009008591 A1 | 1/2009 | |
| WO | 2012057590 A2 | 5/2012 | |
| WO | 2013085256 A1 | 6/2013 | |
| WO | WO-2013161135 A1 | 10/2013 | |
| WO | 2013179095 A1 | 12/2013 | |

\* cited by examiner

UTILIZING IN-DEVICE COEXISTENCE MESSAGE FOR INTERFERENCE MANAGEMENT IN UNLICENSED BANDS

BACKGROUND

Aspects of the present disclosure relate generally to wireless communication systems, and more particularly to Long Term Evolution (LTE) operations in the unlicensed channels.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc.

An LTE UE device normally operates on the licensed frequency spectrum. The unlicensed frequency spectrum, however, may provide an inexpensive resource for wireless communications because no license is required to operate on the unlicensed frequency spectrum. Operation in the unlicensed spectrum, however, may present interference issues. In this context, there remains a need for mechanisms for managing interference in the unlicensed bands.

SUMMARY

Illustrative aspects of the present disclosure that are shown in the drawings are summarized below. These and other aspects are more fully described in the detailed description section. It is to be understood, however, that the disclosure is not limited to the forms described in this Summary or in the detailed description.

In accordance with one or more aspects described herein, there is provided a method for LTE operation in the unlicensed spectrum. For example, the LTE operations may be related to interference management. The method may involve initiating, at the wireless device, a signal measurement of an unlicensed communication band device. The method may involve sending, to an access point configured for operation in the unlicensed communication band, a measurement report including the signal measurement of the unlicensed communication band device.

In related aspects, the method may involve receiving a request from the access point to initiate the signal measurement of the unlicensed communication band device.

In yet further related aspects, the method may initiate the signal measurement automatically at the wireless device based on one of a trigger comprising a high packet error rate, poor channel quality indicator, or based on detection of co-channel transmissions from another wireless device.

In yet further related aspects, the method may involve sending the measurement report using one of a coexistence signaling message or a message configured to carry the signal measurement of the unlicensed communication band device to the access point operating in at least one of the licensed communication band or unlicensed communication band. In an aspect, an in-device coexistence message may be used to send information for cross device interference in unlicensed bands.

In yet further related aspects, the method may involve the measurement report indicating interference from the unlicensed communication band device on a same channel used by the wireless device, and the method further comprises receiving a new channel assignment from the access point configured for operation in the licensed communication band, the new channel being different from the same channel used by the unlicensed communication band device.

In yet further related aspects, the method may involve sending to the access point a request for a transmission pattern associated with a discontinuous reception (DRX) mode. The method may involve broadcasting a clear-to-send-to-self (CTS2S) message prior to start of the DRX mode. The method may involve detecting a level of at least one of acknowledgments (ACKs), clear-to-send (CTS) messages, request-to-send (RTS) messages, or other packets transmitted by a neighboring wireless device, or a pilot strength from the unlicensed communication band device. The method may involve sending the request for the transmission pattern in response to detecting the level above a threshold. The device may include a Wi-Fi device, Bluetooth device, cordless phone, or microwave oven.

DETAILED DESCRIPTION

Figure 1A:
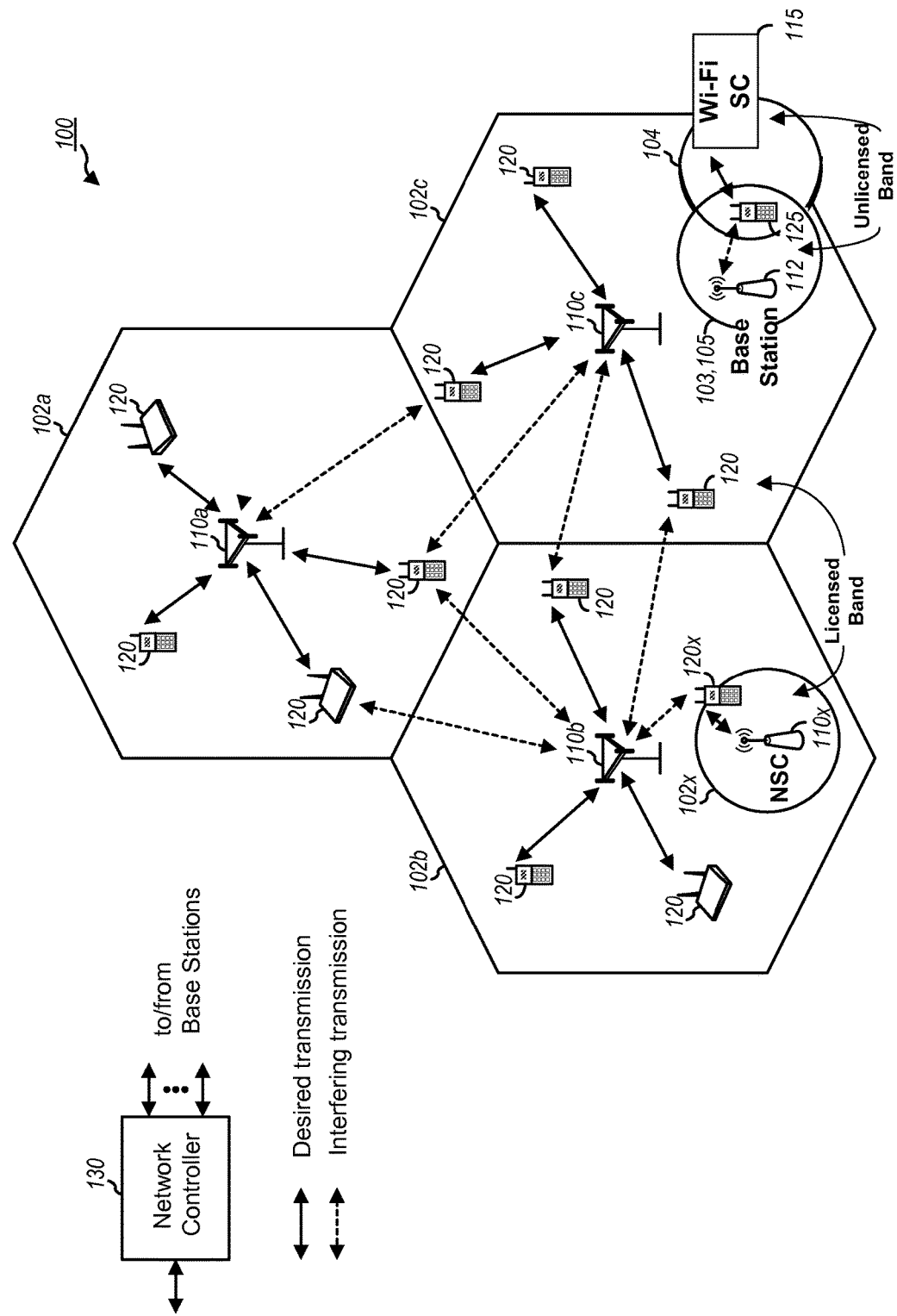
FIG. 1A is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The present disclosure relates to techniques for interference management with non-cellular communications (e.g., wireless local area network (WLAN) communications) on an unlicensed band by UEs and network entities (e.g., a neighborhood small cell (NSC)) sending/receiving cellular communications on the unlicensed band. For example, an in-device coexistence message may be used for interference management. NSCs may provide an alternative to deploying macro base stations to provide increased cellular coverage. However, a major roadblock for wide NSC deployment is the lack of available spectrum on licensed bands. Deploying NSCs on unlicensed bands holds great potential for increasing cellular coverage. It is noted that certain cellular protocols, such as LTE, provides higher spectral efficiency and coverage compared to non-cellular or WLAN protocols, such as Wi-Fi. However, the deployment of NSCs in the unlicensed bands may disrupt or cause interference to non-cellular (e.g., Wi-Fi) communications on the unlicensed bands.

In one example, there is provided a mobile entity or mobile device configured for operation in one or both of the licensed communication band and unlicensed communication band. The mobile device may initiate a signal measurement of an unlicensed communication band device (e.g., Wi-Fi device, microwave, etc.). The mobile device may initiate the signal measurement in response to a request from an access point, or the mobile device may initiate the signal measurement without a request from the access point. The mobile device may send to the access point a measurement report including the signal measurement of the unlicensed communication band device.

In another example, there is provided a network entity device configured for operation in one or both of the licensed communication band and unlicensed communication band. The network entity may receive a measurement report including a signal measurement of an unlicensed communication band device. For example, the measurement report may be received in response to a request from the access point or without a request from the access point.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1A shows an example wireless communication network 100, which may be an LTE network or the like. The wireless network 100 may include a number of base stations 110 (e.g., evolved Node Bs (eNBs), NSCs, etc.) and other network entities. A base station may be a station that communicates with the UEs and may also be referred to as a Node B, an AP, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell or small cell. A small cell may sometimes be referred to as a pico cell, a femto cell, and/or other types of cell. A macro cell may cover a relatively large geographic area (e.g., several kilometers in radius) and may allow unrestricted access by UEs with service subscription. A type of small cell sometimes referred to as a pico cell may cover a relatively small geographic area and may allow unrestricted access by UEs with service subscription. A type of small cell sometimes referred to as a femto cell may cover a relatively small geographic area (e.g., a home) and may allow restricted access by UEs having association with the femto cell (e.g., UEs in a closed subscriber group (CSG), UEs for users in the home, etc.). An NSC is an example of a small cell. As used herein, a small cell means a cell characterized by having a transmit power substantially less than each macro cell in the network with the small cell, and a small cell may include, for example, low-power access nodes such as defined in 3GPP Technical Report (T.R.) 36.932 V12.1.0, Section 4 ("Introduction").

An eNB for a macro cell may be referred to as a macro eNB. An eNB for a small cell may be referred to as a small cell eNB. In the example shown in FIG. 1, the eNBs 110a, 110b and 110c may be macro eNBs for the macro cells 102a, 102b and 102c, respectively.

The eNB 110x may be a NSC eNB for a NSC 102x, serving a UE 120x. In the present example, eNB 110x operates in licensed bands, as do the eNBs 110a, 110b and 110c. In contrast, a base station 112 operates in an unlicensed band, and includes both a NSC eNB module for a NSC 103 and a WLAN AP module to provide Wi-Fi coverage in a service area 105. The dual-capability base station 112 may serve a UE 125 that is configured to operate in the unlicensed band, either via the NSC 103 or via Wi-Fi, assuming the UE 125 is within the coverage area 105 and configured for Wi-Fi (i.e., includes a Wi-Fi radio module).

Figure 1B:
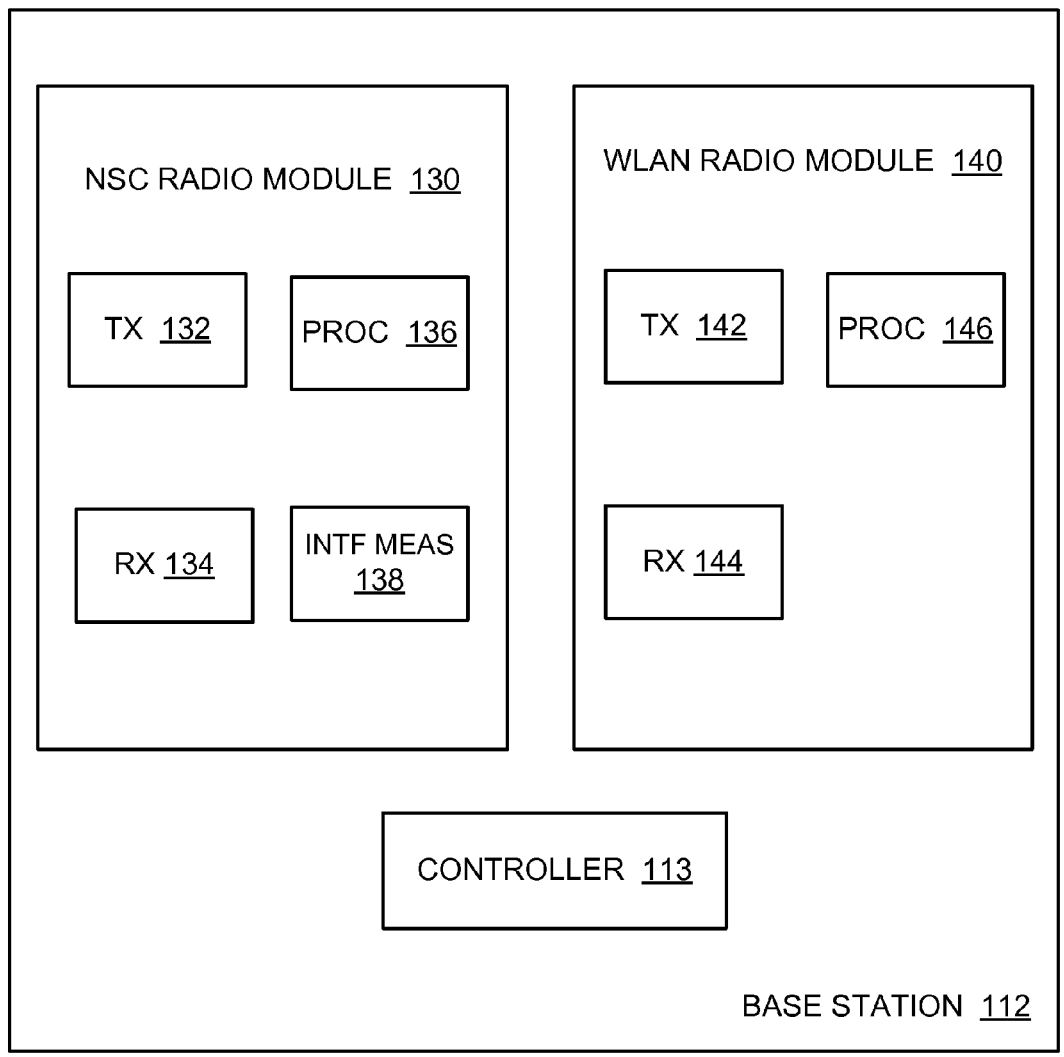
FIG. 1B shows an example dual-capability base station.
Figure 1C:
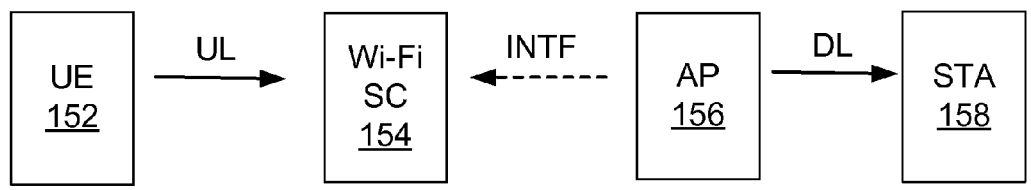
FIG. 1C illustrates a scenario in an unlicensed spectrum resulting in interference at a Wi-Fi service center (SC).
Figure 1D:
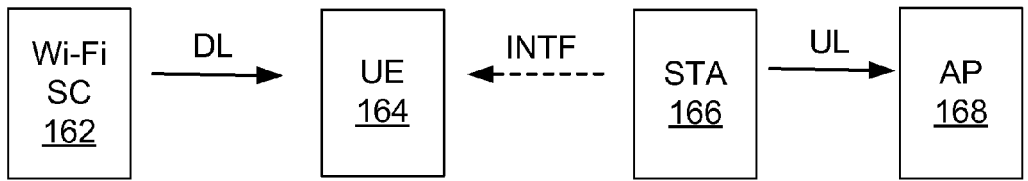
FIG. 1D illustrates a scenario in an unlicensed spectrum resulting in interference at a UE.

An example dual-capability base station 112 is shown in FIG. 1B. For example, a NSC radio module 130 and a WLAN radio module 140 may be co-located.

The base station 112 may optionally include a controller module 113 in operative communication with the NSC radio module 130 and the WLAN radio module 140 to coordinate the activity of the modules 130, 140 and/or components thereof.

In related aspects, the NSC radio module 130 may include a transmitter (TX) component 132, a receiver (RX) component 134, a processor component 136, and an interference measurement component 138, wherein each of the components are in operative communication with each other. The interference measurement component 138 may collect or coordinate collecting interference measurements for interference to or from at least one mobile device, and may include a database of collected interference measurements.

Figure 2:
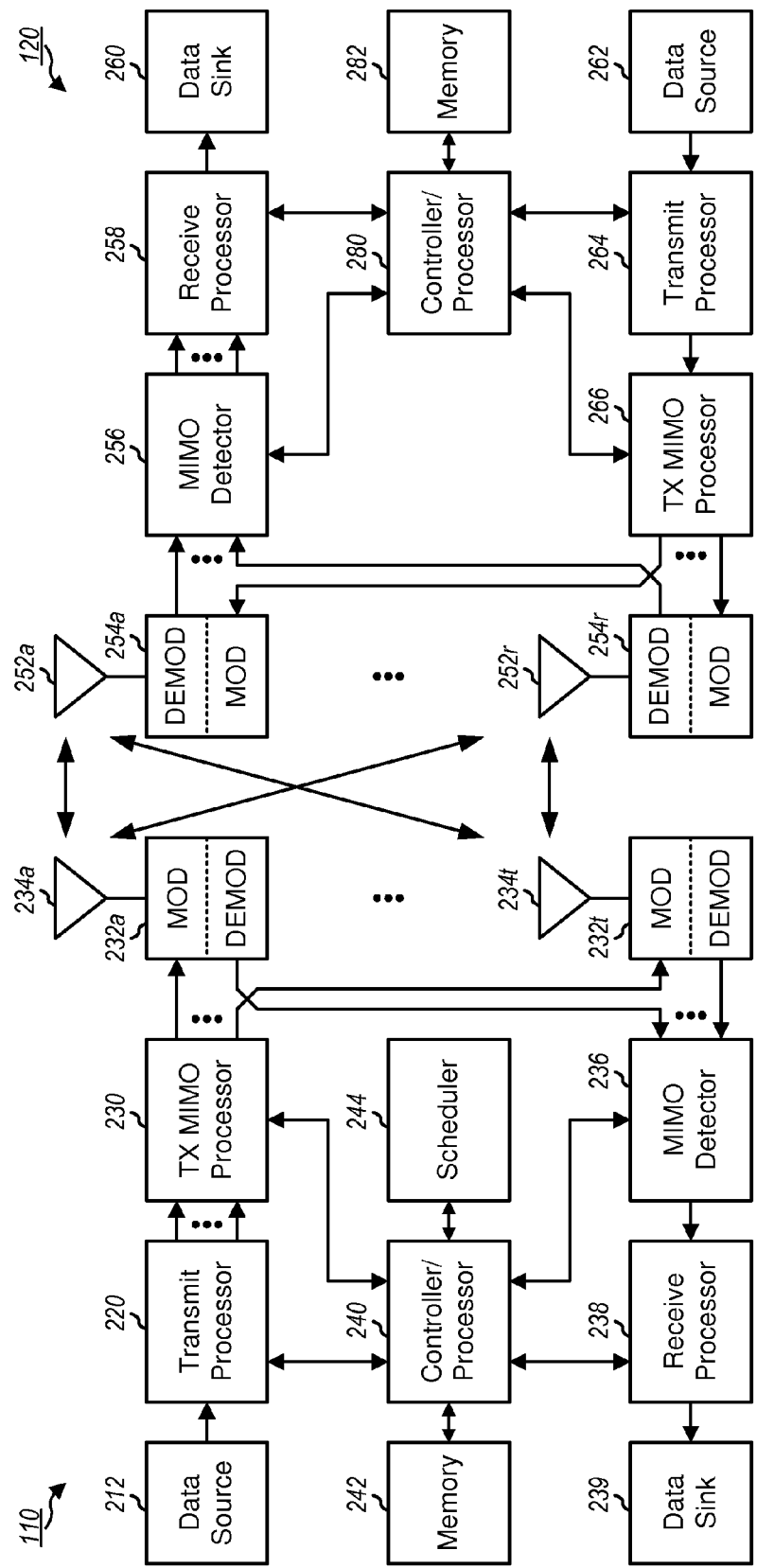
FIG. 2 is a block diagram conceptually illustrating a design of a base station and a UE configured according to one aspect of the present disclosure.

The NSC radio module 130 may include one or more of the components of base station 110 shown on the left hand side of FIG. 2. The WLAN radio module 140 may include a TX component 142, a RX component 144, and a processor component 146, wherein each of the components are in operative communication with each other. In further related aspects, one or more of the components 132-138 may be configured to collect interference measurements when the WLAN radio module 140 is activated. In yet further related aspects, one or more of the components 142-146 may be configured to minimize interference caused or experienced by the base station while the WLAN radio module 140 is activated, according to the exemplary methodologies shown in FIGS. 3-4B, and described in further detail below. The base station 112 may collect interference measurements from mobile devices communicating on channels of the unlicensed band.

With reference once again to FIG. 1A, the network 100 may also include a WLAN AP, such as a Wi-Fi service center (SC) 115 or the like. The Wi-Fi SC 115 operates in the unlicensed band providing Wi-Fi coverage in a service area 104. The Wi-Fi SC 115 may provide Wi-Fi service for a UE 125 that is within the coverage area 104 and configured for Wi-Fi (i.e., includes a Wi-Fi radio module). The UE 125 may be in the NSC 103 and the coverage area 104 simultaneously, and therefore may be capable of both cellular and non-cellular communication in the unlicensed band.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. In FIG. 1A, a solid line with double arrows indicates desired transmissions between a UE and a serving eNB, which is an eNB designated to serve the UE on the downlink and/or uplink. A dashed line with double arrows indicates interfering transmissions between a UE and an eNB.

One challenge to the deployment of NSCs or devices operating in the unlicensed band may be interference to and from non-cellular devices. In one approach, interference management may include reporting measurements from the mobile devices.

In one example, an in-device coexistence message may be used for signaling measurements related to devices operating in the unlicensed frequency spectrum (e.g., Wi-Fi, Bluetooth, cordless phones, microwave, etc.) to LTE networks. The coexistence message was introduced in LTE Rel11 to enable coexistence of LTE and other technologies simultaneously operating on the same device. This message may be utilized to enable robust LTE operation in the unlicensed frequency bands. For example, current interfrequency measurements are not sufficient to report Wi-Fi interference on other channels which make channel selection difficult. Instead, the UE may report which channels are usable and which are not to the eNB using the in-device coexistence message. Moreover, the UE may inform the eNB which radio access technology (RAT) is using this other unusable channel (e.g., it may be Wi-Fi, a different LTE operator, etc.). New metrics (e.g., high packet error rate, poor channel quality indicator) may be needed to trigger the measurements.

In another example, the measurements may be requested by the eNB using reported a CQI pattern. If the UE detects a co-channel jammer (e.g., a mobile station (STA)) the UE may proactively send the coexistence message to the eNB so that the eNB may avoid scheduling the UE on this channel, and the eNB may assign a new channel to the UE. If the UE is in carrier aggregation mode, the eNB may de-activate the secondary component carrier (SCC) associated with the channel and assign a new SCC based on feedback from the UE. The UE may also request a TDM pattern (using discontinuous reception mode (DRX)) for long term use to reduce interference. Before the DRX mode is on, the UE may broadcast a send a clear-to-send-to-self (CTS2S) message to protect transmissions for the DRX mode. The CTS2S message may indicate to other UEs or mobile devices in the vicinity that a UE is about to transmit. The other UEs or mobile stations (STAs) will refrain from using the communication channel during this time. When the DRX mode is off, the UE may not be expecting any data from the eNB. Therefore, the DRX mode may provide a mechanism for sharing the spectrum with Wi-Fi devices.

As an advanced feature, if the UE is a source of interference to nearby Wi-Fi devices (the interference may be deduced from a level of acknowledgements (ACKs), clear-to-send (CTS), request-to-send (RTS) or other packet transmissions by a nearby STA, or beacon level from an access point), the UE may decide to inform the eNB to trigger this TDM/FDM solution to protect nearby Wi-Fi base stations.

FIG. 2 shows a block diagram of a design of a base station 110 and a UE 120, which may be one of the base stations (e.g., an NSB such as 110x, 110y, or 110z) and one of the UEs, respectively, in FIG. 1. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks illustrated in FIGS. 3-4, and/or other processes for the techniques described herein. The memories 242 and 282 may store data and program codes for the base station 110 and the UE 120, respectively. A scheduler 244 may schedule UEs for data transmission on the downlink and/or uplink.

Figure 3:
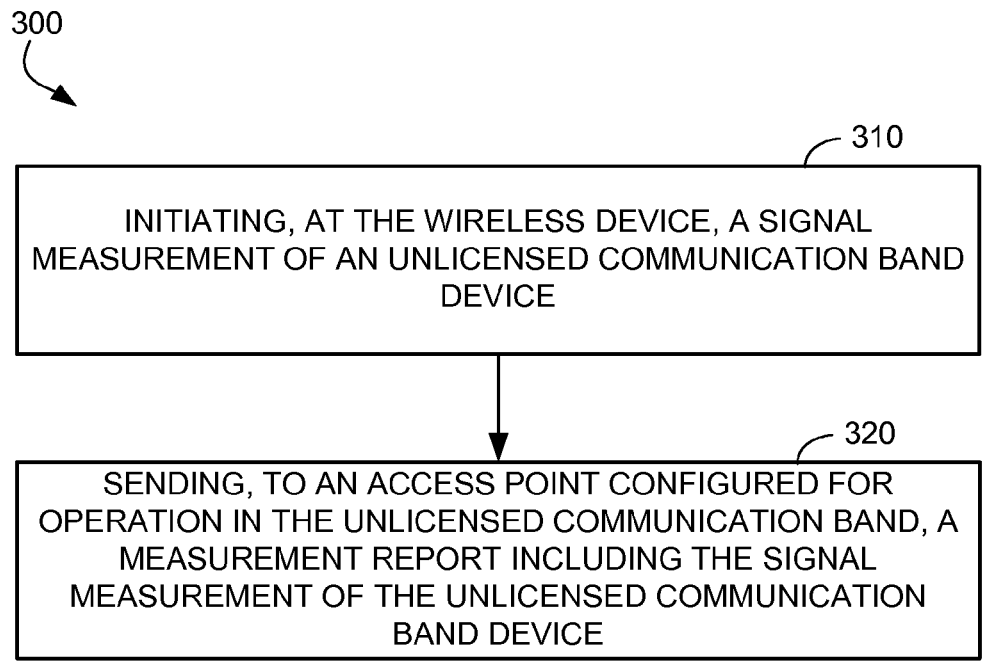
FIG. 3 illustrates an example methodology for interference management on the unlicensed spectrum.

In one configuration, the base station/NSC 110 and/or the UE 120 may include means for performing the process illustrated in FIGS. 3-4. In one example, the aforementioned means may be the processor(s), the controller/processor 280, the memory 282, the receive processor 258, the MIMO detector 256, the demodulators 254a, and the antennas 252a configured to perform the functions recited by the aforementioned means. In another aspect, the aforementioned means may be a module or any apparatus configured to perform the functions recited by the aforementioned means.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

With reference to FIG. 3, illustrated is a methodology 300 that may be performed at a mobile entity, such as, for example, the UE 120 as shown in FIG. 2. The method 300 may involve, at 310, initiating, at the wireless device, a signal measurement of an unlicensed communication band device. The method 300 may involve, at 320, sending, to an access point configured for operation in the unlicensed communication band, a measurement report including the signal measurement of the unlicensed communication band device.

Figure 4A:
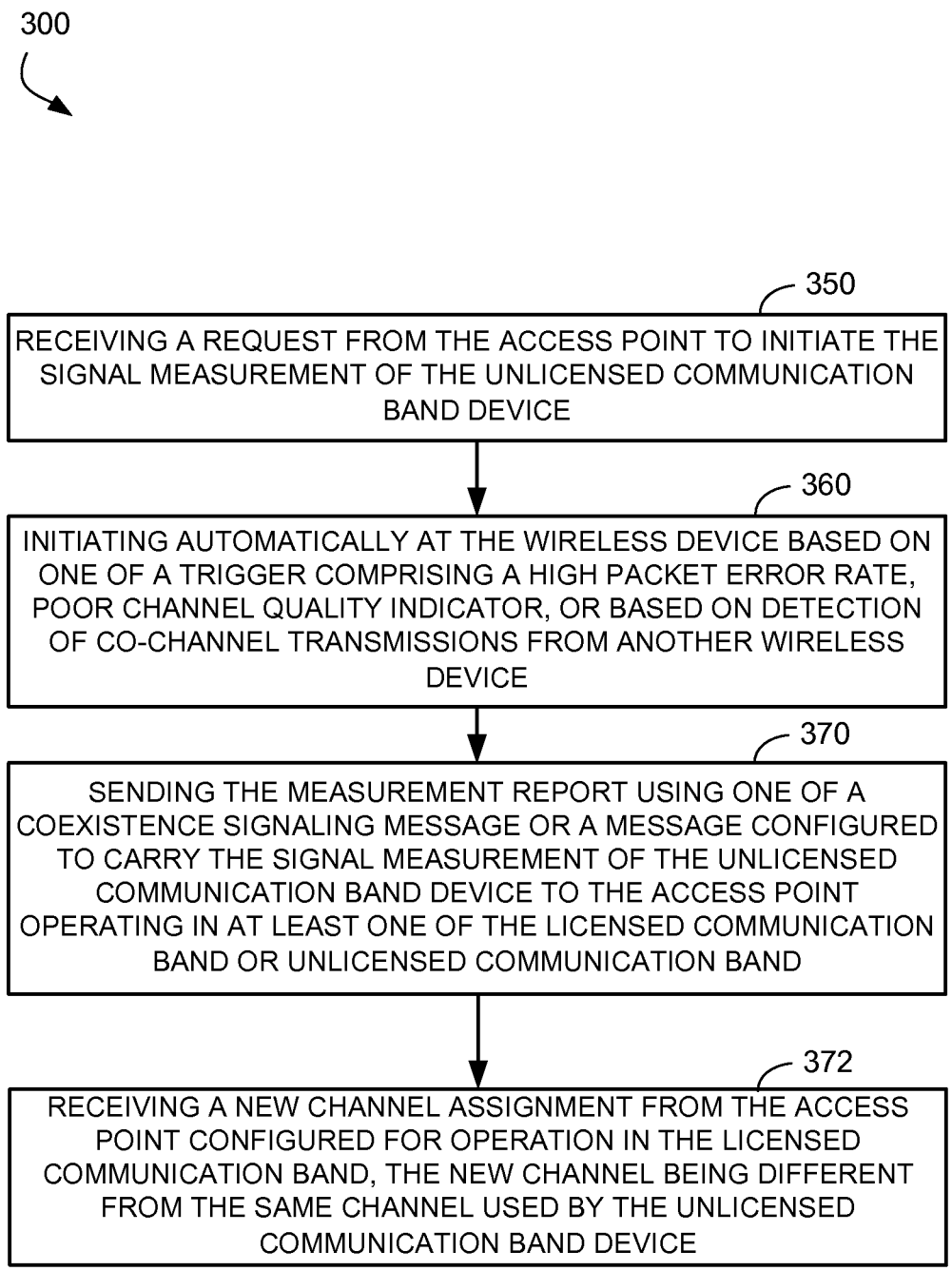
FIGS. 4A-B illustrate further examples or aspects of methodologies for interference management.
Figure 4B:
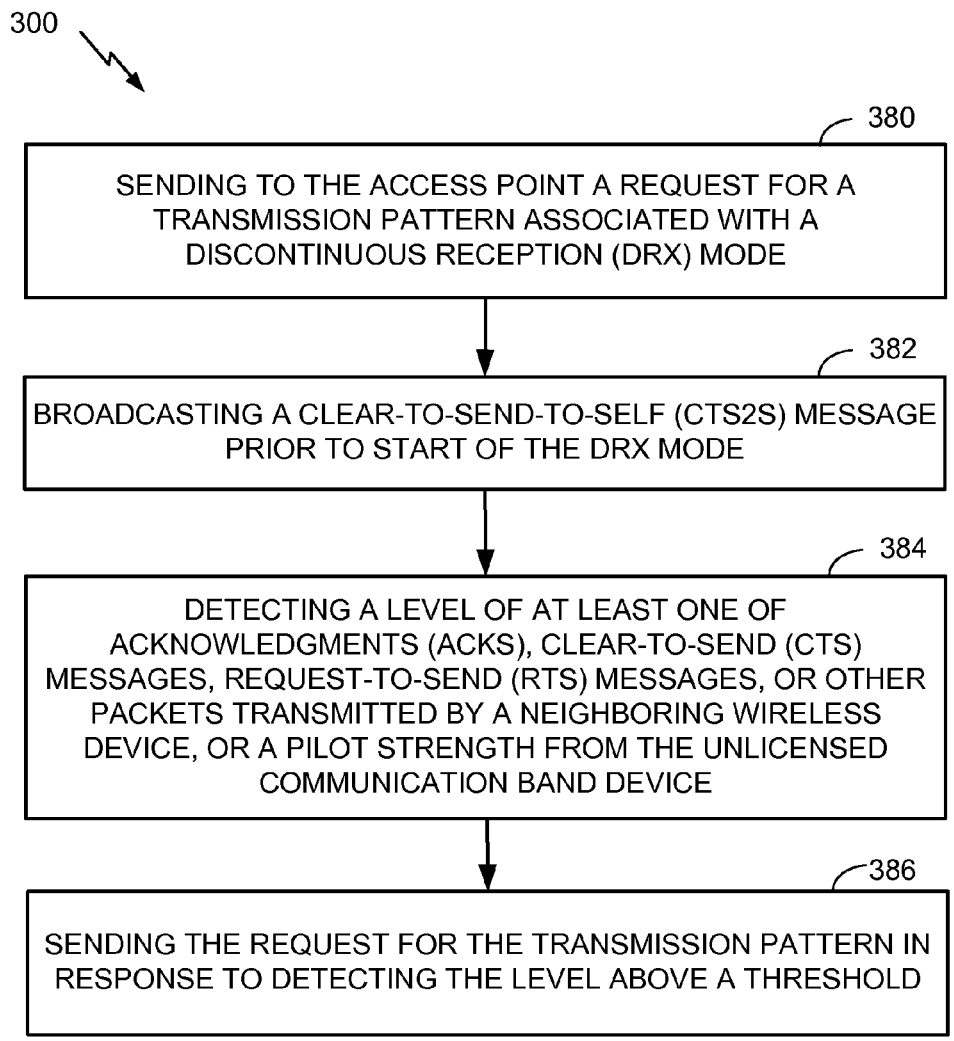

With reference to FIGS. 4A-B, there are shown further operations or aspects of method 300 that are optional are not required to perform the method 300. If the method 300 includes at least one block of FIGS. 4-B, then the method 300 may terminate after the at least one block, without necessarily having to include any subsequent downstream block(s) that may be illustrated.

For example, the method 300 may involve receiving a request from the access point to initiate the signal measurement of the unlicensed communication band device (block 350). The method 300 may involve initiating automatically at the wireless device based on one of a trigger comprising a high packet error rate, poor channel quality indicator, or based on detection of co-channel transmissions from another wireless device (block 360). The method 300 may involve sending the measurement report using one of a coexistence signaling message or a message configured to carry the signal measurement of the unlicensed communication band device to the access point operating in at least one of the licensed communication band or unlicensed communication band (block 370). For example, an in-device coexistence signaling message may be used to send information for cross device interference in the unlicensed bands. The method 300 may involve receiving a new channel assignment from the access point configured for operation in the licensed communication band, the new channel being different from the same channel used by the unlicensed communication band device (block 372).

In related aspects, the method 300 may involve sending to the access point a request for a transmission pattern associated with a DRX mode (block 380). The method 300 may involve broadcasting a CTS2S message prior to start of the DRX mode (block 382). The method 300 may involve detecting a level of at least one of acknowledgments (ACKs), CTS messages, RTS messages, or other packets transmitted by a neighboring wireless device, or a pilot strength from the unlicensed communication band device (block 384). The method 300 may involve sending the request for the transmission pattern in response to detecting the level above a threshold (block 386).

Figure 5:
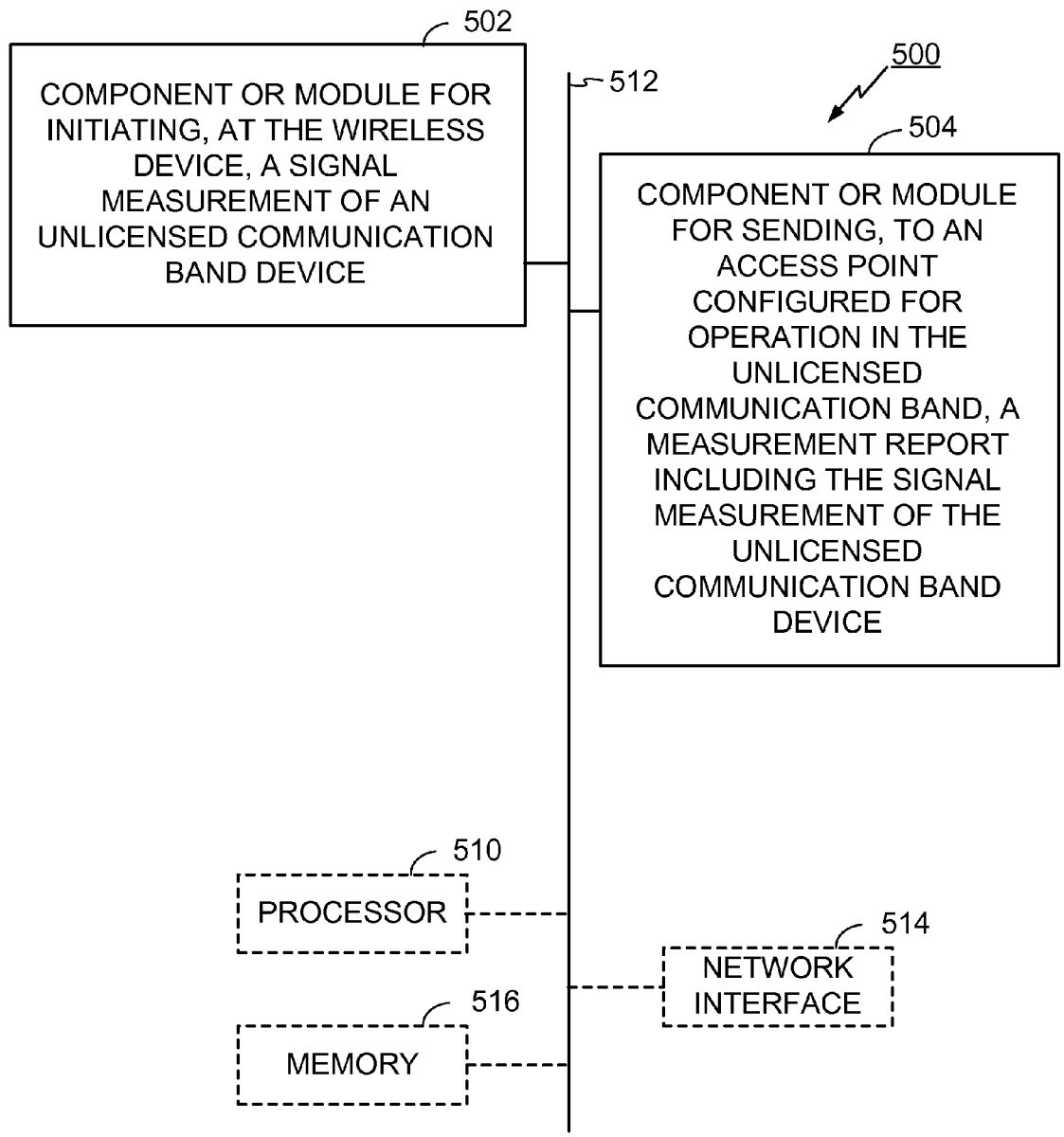
FIG. 5 shows an example apparatus for implementing the method of FIGS. 3-4B.

With reference to FIG. 5, there is provided an exemplary apparatus 500 that may be configured as a UE, network entity, or other suitable entity, or as a processor, component or similar device for use within the UE, network entity, or other suitable entity, for network node selection. The apparatus 500 may include functional blocks that can represent functions implemented by a processor, software, or combination thereof (e.g., firmware).

As illustrated, in one example, the apparatus 500 may include an electrical component or module 502 for initiating, at the wireless device, a signal measurement of an unlicensed communication band device. The component or module 502 may be, or may include, a means for initiating, at the wireless device, a signal measurement of an unlicensed communication band device. Said means may be, or may include, a processor connected to a transceiver executing an algorithm from a computer memory. An algorithm may include, for example, detecting a signal in an unlicensed band, correlating the signal to the unlicensed communication band device, and measuring one or more of a packet error rate, channel quality indicator, co-channel transmissions, signal strength, signal-to-noise ratio, or other signal quality associated with the signal.

The apparatus 500 may include an electrical component or module 504 for sending, to an access point configured for operation in the unlicensed communication band, a measurement report including the signal measurement of the unlicensed communication band device. The component or module 504 may be, or may include, a means for sending, to an access point configured for operation in the unlicensed communication band, a measurement report including the signal measurement of the unlicensed communication band device. Said means may be, or may include, a processor connected to a transceiver executing an algorithm from a computer memory. An algorithm may include, for example, outputting data including an indication of the signal measurement in a report format, encoding the data, and sending the data to an access point.

In related aspects, the apparatus 500 may optionally include a processor component 510 having at least one processor, in the case of the apparatus 500 configured as a network entity. The processor 510, in such case, may be in operative communication with the components 502-504 or similar components via a bus 512 or similar communication coupling. The processor 510 may effect initiation and scheduling of the processes or functions performed by electrical components or modules 502-504.

In further related aspects, the apparatus 500 may include a network interface component 514 for communicating with other network entities. The apparatus 500 may optionally include a component for storing information, such as, for example, a memory device/component 516. The computer readable medium or the memory component 516 may be operatively coupled to the other components of the apparatus 500 via the bus 512 or the like. The memory component 516 may be adapted to store computer readable instructions and data for performing the activity of the components 502-504, and subcomponents thereof, or the processor 510. The memory component 516 may retain instructions for executing functions associated with the components 502-504. While shown as being external to the memory 516, it is to be understood that the components 502-504 can exist within the memory 516.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure.

Thus, the disclosure is not intended to be limited to the examples and designs described herein but is to be accorded the widest scope consistent with the principles and novel features disclosed herein.

What is claimed is:

1. A method operable by a user equipment (UE) configured to perform cellular communications using a licensed communication band and an unlicensed communication band, the method comprising:
   initiating, at the UE, a signal measurement associated with a first channel of the unlicensed communication band used by the UE for the cellular communications and used by a wireless device for non-cellular communications, the wireless device being different than the UE;
   sending, to an access point configured to operate in the unlicensed communication band, an in-device coexistence message including the signal measurement associated with the first channel, wherein the in-device coexistence message indicates Wireless Fidelity (Wi-Fi) interference experienced by the UE on the first channel and caused by the non-cellular communications of the wireless device on the first channel, and wherein the in-device coexistence message is sent using the cellular communications via the unlicensed communication band;
   receiving, at the UE, an assignment indicating a new channel in the unlicensed communication band, wherein the new channel is used for the cellular communications, wherein the assignment is received from the access point, wherein the new channel for the cellular communications is different from the first channel on which the wireless device remains for the non-cellular communications;
   detecting a level of at least one of acknowledgments (ACKs), clear-to-send (CTS) messages, request-to-send (RTS) messages, or other packets transmitted by a neighboring UE, or a pilot strength from the wireless device;
   sending to the access point a request for a transmission pattern associated with a discontinuous reception (DRX) mode in response to detecting the level above a threshold; and
   broadcasting a clear-to-send-to-self (CTS2S) message prior to start of the DRX mode.

2. The method of claim 1, further comprising receiving a request from the access point to initiate the signal measurement of the wireless device.

3. The method of claim 1, wherein initiating the signal measurement comprises initiating automatically at the UE based on one of a trigger comprising a high packet error rate, poor channel quality indicator, or based on detection of co-channel transmissions from another UE.

4. The method of claim 1, wherein the wireless device comprises one of a Wi-Fi device, Bluetooth device, cordless phone, or microwave oven.

5. A user equipment (UE) configured to perform cellular communications using a licensed communication band and an unlicensed communication band, comprising:
   means for initiating, at the UE, a signal measurement associated with a first channel of the unlicensed communication band used by the UE for the cellular communications and used by a wireless device for non-cellular communications, configured to operate in the unlicensed communication band, wherein the UE is operating in the first channel of the unlicensed communication band, the wireless device being different than the UE;
   means for sending, to an access point configured to operate in the unlicensed communication band, an in-device coexistence message including the signal measurement associated with the first channel, wherein the in-device coexistence message indicates Wireless Fidelity (Wi-Fi) interference experienced by the UE on the first channel and caused by the non-cellular communications of the wireless device on the first channel of the unlicensed communication band used by the UE for sending and receiving cellular communications, and wherein the in-device coexistence message is sent using the cellular communications via the unlicensed communication band;
   means for receiving, at the UE, an assignment indicating a new channel in the unlicensed communication band, wherein the new channel is used for the cellular communications, wherein the assignment is received from the access point, wherein the new channel for the cellular communications is different from the first channel on which the wireless device remains for the non-cellular communications;
   means for detecting a level of at least one of acknowledgments (ACKs), clear-to-send (CTS) messages, request-to-send (RTS) messages, or other packets transmitted by a neighboring UE, or a pilot strength from the wireless device;
   means for sending to the access point a request for a transmission pattern associated with a discontinuous reception (DRX) mode in response to detecting the level above a threshold; and
   means for broadcasting a clear-to-send-to-self (CTS2S) message prior to start of the DRX mode.

6. The UE of claim 5, further comprising:
   means for receiving a request from the access point to initiate the signal measurement of the wireless device.

7. The UE of claim 5, wherein the means for initiating the signal measurement is further configured for initiating automatically at the UE based on one of a trigger comprising a high packet error rate, poor channel quality indicator, or based on detection of co-channel transmissions from another UE.

8. The UE of claim 5, wherein the wireless device comprises one of a Wi-Fi device, Bluetooth device, cordless phone, or microwave oven.

9. A UE configured for performing cellular communications using a licensed communication band and an unlicensed communication band, comprising:
   a memory; and
   at least one processor coupled to the memory and configured to:
   initiate, at the UE, a signal measurement associated with a first channel of the unlicensed communication band used by the UE for the cellular communications and used by a wireless device for non-cellular communications, configured to operate in the unlicensed communication band, wherein the UE is operating in the first channel of the unlicensed communication band, the wireless device being different than the UE;
   send, to an access point configured to operate in the unlicensed communication band, an in-device coexistence message including the signal measurement associated with the first channel, wherein the in-device coexistence message indicates Wireless Fidelity (Wi-Fi) interference experienced by the UE on the first channel and caused by the non-cellular communications of the wireless device on the first channel of the unlicensed communication band used by the UE for sending and receiving cellular communications, and wherein the in-device coexistence message is sent using the cellular communications via the unlicensed communication band;

receive, at the UE, an assignment indicating a new channel in the unlicensed communication band, wherein the new channel is used for the cellular communications, wherein the assignment is received from the access point, wherein the new channel for the cellular communications is different from the first channel on which the wireless device remains for the non-cellular communications;

detect a level of at least one of acknowledgments (ACKs), clear-to-send (CTS) messages, request-to-send (RTS) messages, or other packets transmitted by a neighboring UE, or a pilot strength from the wireless device;

send to the access point a request for a transmission pattern associated with a discontinuous reception (DRX) mode in response to detecting the level above a threshold; and broadcast a clear-to-send-to-self (CTS2S) message prior to start of the DRX mode.

10. The UE of claim 9, wherein the at least one processor is further configured to:
receive a request from the access point to initiate the signal measurement of the wireless device.

11. The UE of claim 9, wherein the at least one processor is configured to initiate the signal measurement by initiating automatically at the UE based on one of a trigger comprising a high packet error rate, poor channel quality indicator, or based on detection of co-channel transmissions from another UE.

12. The UE of claim 9, wherein the wireless device comprises one of a Wi-Fi device, Bluetooth device, cordless phone, or microwave oven.

13. A non-transitory computer-readable medium storing computer executable code for a user equipment (UE) configured to perform cellular communications using a licensed communication band and an unlicensed communication band, the method comprising, comprising code to:
initiate, at the UE, a signal measurement associated with a first channel of the unlicensed communication band used by the UE for the cellular communications and used by a wireless device for non-cellular communications, configured to operate in the unlicensed communication band, wherein the UE is operating in the first channel of the unlicensed communication band, the wireless device being different than the UE;

send, to an access point configured to operate in the unlicensed communication band, an in-device coexistence message including the signal measurement associated with the first channel, wherein the in-device coexistence message indicates Wireless Fidelity (Wi-Fi) interference experienced by the UE on the first channel and caused by the non-cellular communications of the wireless device on the first channel of the unlicensed communication band used by the UE for sending and receiving cellular communications, and wherein the in-device coexistence message is sent using the cellular communications via the unlicensed communication band;

receive, at the UE, an assignment indicating a new channel in the unlicensed communication band, wherein the new channel is used for the cellular communications, wherein the assignment is received from the access point, wherein the new channel for the cellular communications is different from the first channel on which the wireless device remains for the non-cellular communications;

detect a level of at least one of acknowledgments (ACKs), clear-to-send (CTS) messages, request-to-send (RTS) messages, or other packets transmitted by a neighboring UE, or a pilot strength from the wireless device;

send to the access point a request for a transmission pattern associated with a discontinuous reception (DRX) mode in response to detecting the level above a threshold; and broadcast a clear-to-send-to-self (CTS2S) message prior to start of the DRX mode.

14. The non-transitory computer-readable medium of claim 13, further comprising code to:
receive a request from the access point to initiate the signal measurement of the wireless device.

15. The non-transitory computer-readable medium of claim 13, wherein the code is configured to initiate the signal measurement by initiating automatically at the UE based on one of a trigger comprising a high packet error rate, poor channel quality indicator, or based on detection of co-channel transmissions from another UE.

* * * * *